Figure 1:
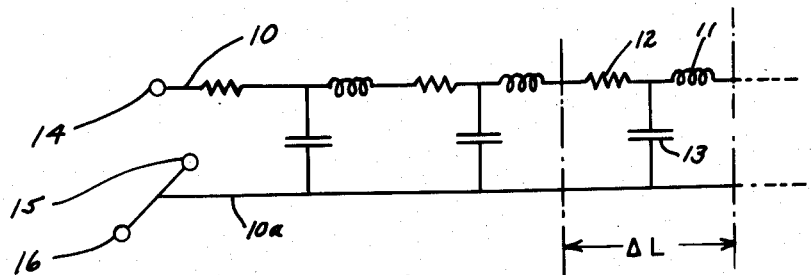

Oct. 17, 1950

N. E. BEVERLY 2,526,321

ARTIFICIAL TRANSMISSION LINE

Filed June 1, 1946

3 Sheets-Sheet 1

NELSON E. BEVERLY
INVENTOR

BY
ATTORNEY

Oct. 17, 1950  N. E. BEVERLY  2,526,321
ARTIFICIAL TRANSMISSION LINE

Filed June 1, 1946  3 Sheets-Sheet 2

NELSON E. BEVERLY
INVENTOR

BY *Arthur J. Connolly*
ATTORNEY

Oct. 17, 1950 N. E. BEVERLY 2,526,321
ARTIFICIAL TRANSMISSION LINE
Filed June 1, 1946 3 Sheets-Sheet 3

NELSON E. BEVERLY
INVENTOR

BY *Arthur J. Connolly*
ATTORNEY

Patented Oct. 17, 1950

2,526,321

UNITED STATES PATENT OFFICE 2,526,321

ARTIFICIAL TRANSMISSION LINE

Nelson E. Beverly, Williamstown, Mass., assignor to Sprague Electric Company, North Adams, Mass., a corporation of Massachusetts Application June 1, 1946, Serial No. 673,726

13 Claims. (Cl. 178—44)

1

This invention relates to new and improved electrical circuits and more particularly refers to artificial transmission lines having characteristics which are highly desirable, but heretofore have been practically unattainable. The application is filed as a continuation-in-part of U. S. patent application, Serial No. 495,621, filed July 21, 1943, by Nelson E. Beverly, and entitled "Artificial Transmission Line," now Patent No. 2,440,652, granted April 27, 1948.

The classical picture of a transmission line is a network of an infinite number of sections, each consisting primarily of a series inductance (corresponding to the inductance per unit length of the wire constituting the transmission line), a series resistance (corresponding to the resistance per unit length of the wire) and a parallel capacity (which is the capacity to ground or between adjacent wires of a unit length of the wire). Such transmission lines are very useful particularly in high frequencies in transmitting or rejecting signals, in matching or transforming impedances, and in delaying and forming and modifying the wave-shape of the signals.

It is well known in the art to make artificial transmission lines with so-called lumped characteristics, that is to say, made up of a finite number of inductances and capacities, and these artificial transmission lines with lumped parameters have been quite successful. At high frequencies they suffer from the defect, however, that the lumped inductance has a high distributed capacity, and that the lumped capacity has a high series inductance so that it is extremely difficult to obtain the electrical equivalent of the natural transmission line. At the same time the natural transmission line to have useful qualities is so long physically that it is difficult, if not impossible, to make use of it in the lower radio frequencies.

A further difficulty with the known artificial line is that it is impossible to match the behavior of the natural line at the physical start of the line. In the natural line there is actually shunt capacity appearing as part of the line from its very inception. There is likewise series inductance appearing in the natural line upon its inception. With the artificial line a choice must be made between starting with either a series inductance or a shunt capacitance and this choice necessarily makes the resulting network differ from the natural prototype.

It is an object of the present invention to overcome the foregoing and other disadvantages of the prior art. A further object is to produce

2 new electrical circuits having desirable characteristics. A still further object is to produce an artificial transmission line which combines the advantages of prior art transmission lines without at the same time being subject to their disadvantages. A still further object is to produce artificial transmission lines and networks of simple physical structure which have characteristics greatly desired but heretofore unattainable. Additional objects will become apparent from a consideration of the following description and claims.

These objects are attained in accordance with the present invention wherein there is produced an artificial transmission line comprising two layers of electrically conducting materials separated by layers of dielectric material and convolutely wound, one of said layers of electrically conducting materials being connected on both sides throughout substantially its entire length to terminals and the other of said layers of electrically conducting materials being connected to a terminal only at one or more points forming a section of balanced impedance. In a more restricted sense, the invention is concerned with an artificial transmission line comprising a wide electrode foil and a narrow electrode foil separated by layers of dielectric material of intermediate width and convolutely wound, the wide electrode foil being connected on both sides throughout substantially its entire length to terminals and the narrow electrode foil being connected to a terminal only at the center of the outer extremity of said foil. In a still more restricted sense, the invention is concerned with an artificial transmission line comprising a wide electrode foil and a narrow electrode foil separated by layers of dielectric material of intermediate width, the longitudinal center line of each of said foils registering with each other and the resulting assembly being convolutely wound, the projecting edges of the wide foil being imbedded in low resistance electrically-conducting material which is connected to terminals for the system and the narrow foil being connected to a terminal of the system only at a median point, with respect to the foil width, of the outer extremity of said foil. The invention is further concerned with an artificial transmission line comprising two electrode foils separated by layers of dielectric material and convolutely wound upon a conducting and/or highly permeable core, one of said electrode foils being connected on both sides throughout substantially its entire length to terminals and the other of said electrode foils being connected to a terminal only at a median point, with respect to the width of said foil.

In another embodiment this invention concerns artificial transmission lines comprising two electrode foils separated by layers of dielectric material and convolutely wound upon an electrically conducting core, one of said electrode foils being electrically connected on both sides throughout substantially its entire length to said core and the other of said foils being connected to a terminal only at a median point with respect to the width of said foil. In still another embodiment this invention relates to an artificial transmission line comprising a wide electrode foil and a narrow electrode foil separated by layers of dielectric material of intermediate width and convolutely wound, the wide electrode foil being connected on both sides throughout substantially its entire length to terminals and the narrow electrode foil being connected to a terminal over substantially the entire width of its outer extremity. The invention is also concerned with uses of these artificial transmission lines such as in electrical circuits for bypassing undesired high frequencies. The invention is further concerned with various modifications, mounting methods, etc., for the novel transmission lines.

This invention also refers to a novel, convolutely wound, artificial transmission line comprising a narrow electrode foil and a wide electrode foil separated by dielectric spacers which overlay said foils except for one longitudinal edge of the wide foil, the protruding edge of said wide foil being terminated substantially throughout the length of the winding to a conductor which passes through the axis of the winding, the narrow electrode foil being terminated at least at one point, which may be a median point or a point on the opposite side of the winding from the wide foil termination.

Figure 2:
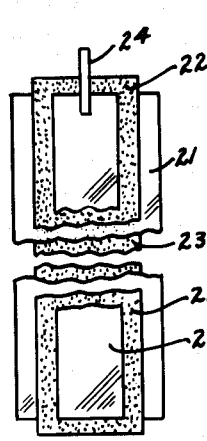
Figure 3:
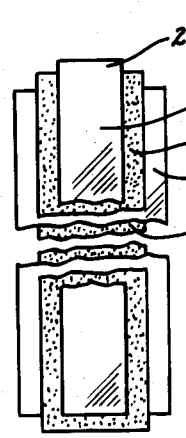
Figure 4:
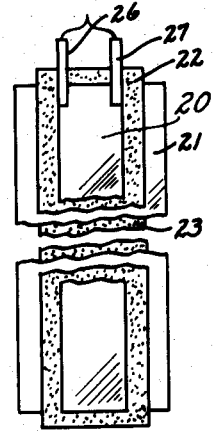
Figure 5:
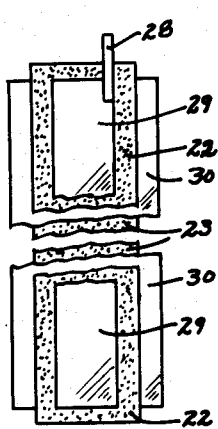
Figure 10:
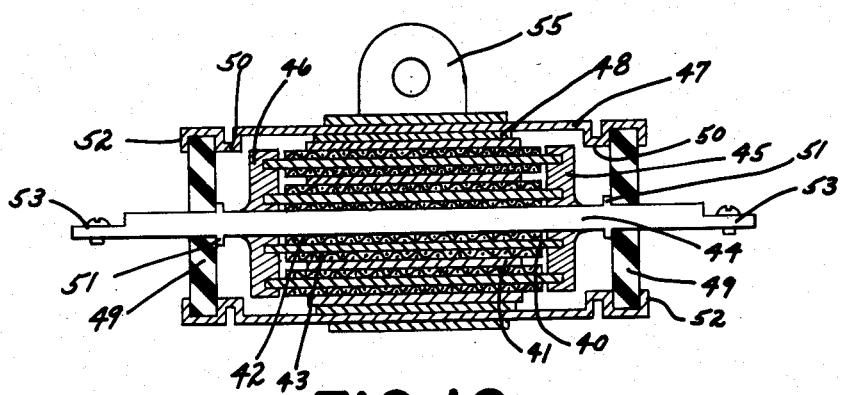
Figure 11:
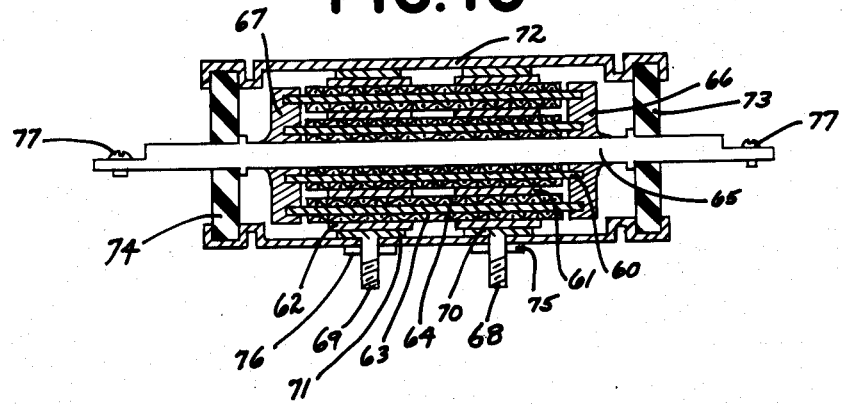
Figure 12:
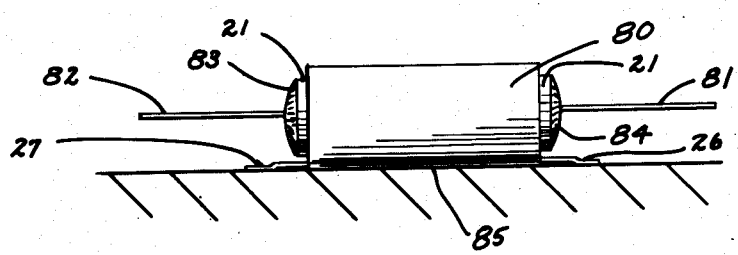
Figure 13:
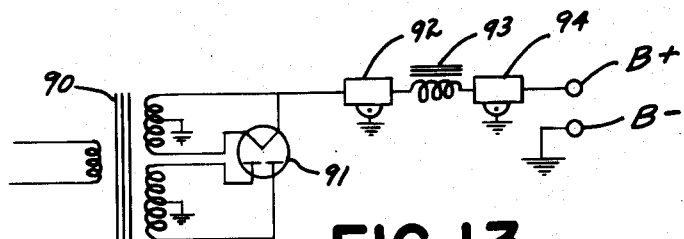
Figure 14:
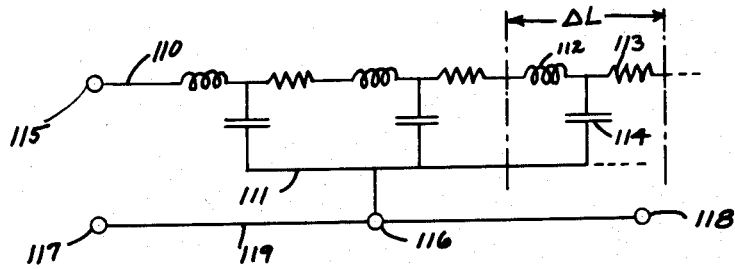
Figure 15:
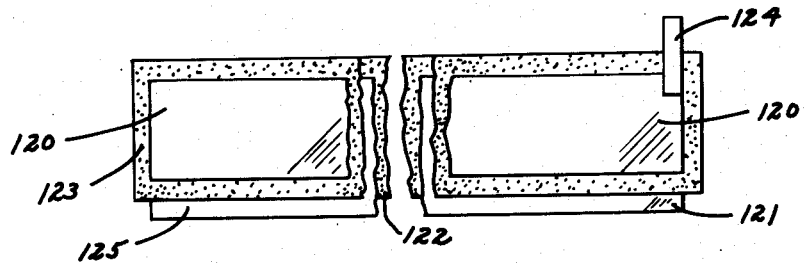
Figure 16:
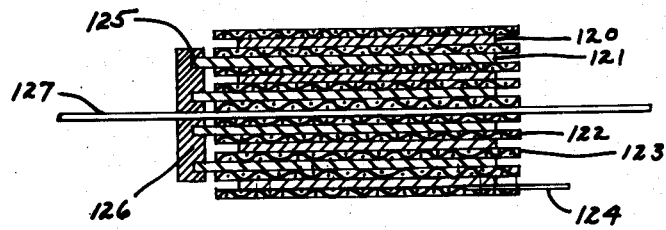

Reference is made to the appended drawings in which:

Figure 1 shows a schematic electrical diagram of the artificial transmission lines of the invention, Figures 2, 3 and 4 represent the appearance of the lines of the invention before winding, while Figure 5 represents a known type of filter condenser before winding, Figures 6, 7, 8 and 9 represent schematic cross-sections and electrical diagrams of the wound units of Figures 2, 3, 4 and 5, respectively, Figure 10 represents a cross-sectional view of an artificial transmission line produced in accordance with the invention, Figure 11 represents a dual section produced in accordance with the invention, Figure 12 represents another transmission line produced in accordance with the invention, Figure 13 represents a schematic diagram of a power supply circuit employing the lines of the invention as filter units, and Figure 14 represents a schematic electrical diagram of another embodiment of this invention, Figure 15 shows the transmission line of Figure 14 before winding, and Figure 16 shows a vertical cross-section of it after winding.

Referring more specifically to Figure 1, the schematic circuit diagram of the transmission lines of the invention is shown. Two conductors 10 and 10a are each comprised of a large number of meshes, one of which is represented as $\triangle$ L. Each mesh has, in one conductor, series inductance and resistance, 11 and 12, respectively and a shunt capacitance, 13. Since there are a great number of these individual armatures or meshes, the total line possesses the distributed constants of a co-axial transmission line. Terminal 14 is affixed to one extremity of one conductor while terminals 15 and 16 are connected to the other conductor.

Referring more specifically to Figure 2, one of the transmission lines of the invention is shown, as laid out before winding. 20 represents a narrow electrode foil and 21 represents a wide electrode foil, with dielectric spacing material of intermediate width, 22 and 23, separating the foils. The wide electrode foil 21 advisably extends beyond both side edges of the dielectric spacers 22 and 23, and the narrow electrode foil 20. These extended edges, following convolute winding of the unit, are terminated by means of a low resistance material such as shown at 45—46 in Figure 10. The narrow electrode foil 20 is terminated by means of terminal 24 which is disposed at a point of balanced impedance of the foil at its extremity, usually the outer extremity for the sake of convenience and optimum electrical properties. The disposition of this terminal 24 upon the narrow foil, in conjunction with the line construction herein shown, forms one of the preferred embodiments of the invention.

Figure 3 shows another preferred embodiment of the invention. The transmission line as shown is similar to that of Figure 2 except for the method employed in terminating the narrow electrode foil. In this figure, the outer extremity 25 of narrow electrode foil 20 extends beyond the dielectric spacing materials 22 and 23, and is used as a direct termination arrangement by connection across the width of the narrow electrode foil 20, no individual terminal being provided therefor.

Another preferred embodiment is shown in Figure 4. The structure illustrated is similar to that shown in Figure 2, with the exception of the terminal arrangement. In this arrangement, two individual terminals 26 and 27 are disposed at or near each side of the outer extremity of the narrow foil 20, and extend beyond or to the side of the dielectric spacing material 22 and 23. These individual terminals may be interconnected by leads, as shown, or both directly connected to a ground (see Figure 12), thus forming a terminal structure that is connected to the narrow foil 20 symmetrically with respect to the width thereof.

With reference to Figure 5, 29 represents a narrow electrode foil and 30 a wide electrode foil. These foils are employed with dielectric spacers 22 and 23 of intermediate width. The narrow electrode foil extends beyond the outer extremity of the wide electrode foil and is terminated at one side edge by means of terminal 28 which may extend beyond the outer surface winding or from the side thereof. This structure has been suggested for use as a filter condenser, in Voigt U. S. Patent No. 2,259,234. This patent is rather obscure in its description, but Figure 3 apparently shows a structure wherein a narrow foil is separated from a metal container by insulating material, except for connections to the container taken from two points on one edge of the outer turn.

Figures 6, 7, 8 and 9 show schematic electrical circuit appearances of the transmission lines of Figures 2, 3 and 4 and of the filter condenser of Figure 5 respectively. These figures show the impedance elements introduced by the manner of terminating the narrow electrode foils. These impedance elements may be referred to as the common coupling impedance, although heretofore it has not been considered in the design of filter condensers since it was assumed to be negligible. I have found that this is actually not the case, and the present invention is based in part upon the discovery of its importance, and means of eliminating or reducing it entirely.

The common coupling impedance of a network or a transmission line is that impedance of the unit which is common to both the input circuit and the output circuit. For comparative purposes the common coupling impedance of the line, when the latter is employed to by-pass high frequency currents, consists principally of two separate impedance in series. First, the impedance of the network or transmission line per se, which will be assumed to be relatively the same in all the figures now being discussed. The second impedance consists of the impedance to current flow across the narrow electrode foil to the terminal plus the impedance through the terminal to the circuit proper, generally ground.

The impedance across the extremity of the narrow foil will be represented as $Z_1$, while the impedance through the terminal to ground will be represented as $Z_2$ in the figures.

Figures 6, 7, 8, 9:
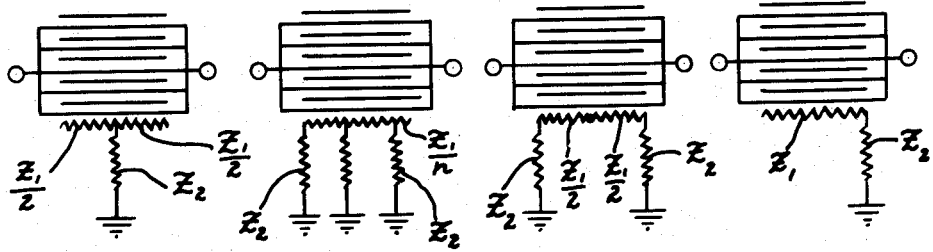

With the terminal at the median point of the narrow electrode foil, as shown in Figures 2 and 6, the foil impedance to the terminating point is divided into two equal parts, $Z_1/2$. The average impedance from all points along $Z_1/2$ to the terminal point would therefore be $Z_1/4$. Since there is impedance on both sides of the terminal point—in parallel—the foil impedance would be $$Z_{foil}=\frac{\left(\frac{Z_1}{4}\right)^2}{\frac{Z_1}{4}+\frac{Z_1}{4}}=\frac{Z_1}{8}$$

and the total impedance with the series terminal impedance would be $$Z_{total}=\frac{Z_1}{8}+Z_2$$

In the case of the line of Figures 3 and 7, there are a very large number, $n$, of individual terminating points, with a very large number, $n$, of terminals in parallel. It can be shown as follows that the total impedance, $Z_{total}$ approaches $Z_2/n$ as $$n \to a$$
$$Z_2 \to 0$$

$$Z_{individual}=\frac{\left(\frac{Z_1}{4n}\right)^2}{\frac{Z_1}{4n}+\frac{Z_1}{4n}}+Z_2=\frac{Z_1}{8n}+Z_2$$

since the individual Z's are in parallel, and as $$Z_2 \to 0$$
$$Z_1 \to 0$$

$$Z_{total}=\frac{\left(\frac{Z_1}{8n}+Z_2\right)^2}{n\left(\frac{Z_1}{8n}+Z_2\right)}$$

and as $n$ becomes large, approaches $$Z_{total}=\frac{Z_2}{n}$$

In the case of the structures of Figures 4 and 8, there are two individual average path impedances in parallel:

$$Z_{individual}=\frac{Z_1}{4}+Z_2$$

$$Z_{total}=\frac{Z_1}{8}+\frac{Z_2}{2}$$

In the case of the structure shown in Figures 5 and 9, there is only an average impedance across the narrow foil, $Z_1/4$ in series with the terminating impedance $Z_2$, giving $$Z_{total}=\frac{Z_1}{2}+Z_2$$

It will be readily apparent from the above figures that the common coupling impedance of the lines of the invention are decidedly lower than those in the prior art filter condenser of U. S. Patent No. 2,259,234, referred to previously. This lower impedance is particularly advantageous when the line is employed as a three-terminal network to remove high frequency elements of a transmission signal current. In other words, the direct current and low frequency signals can pass along or across the wide electrode foil from one extremity to the other without loss, while the higher frequencies such as radio frequencies are dissipated out along and between the electrode foils.

The transmission line in Fig. 10 comprises interwound metal electrode foils 40 and 41 convolutely wound with interposed insulating dielectric spacers 42—43 around an electrically-conducting core 44 which extends from both edges of the wound sections. Foil 40 extends from both edges of the wound section and is electrically connected to the core 44 by means of low resistance electrical shunts 45—46 of solder or the like embedding the protruding edges of the foil 40 and surrounding and in contact with the adjacently positioned portions of the core 44.

An open-ended metal container 47 of aluminum, terne plate, brass, copper, steel or the like encloses the wound section and is electrically connected to the foil 41 by means of solder fillets 48 and for this purpose the outer turn of the foil 41 forms a terminal section across its width. If so desired the outer turn of foil 41 may be exposed to and in direct contact with the container throughout its surface. The ends of the container 47 are hermetically sealed by semi-resilient insulating covers 49—49 which abut against internally formed annular beads 50—50 of the container 47 and integral collars 51—51 of the core 44 and are secured in position by swaging the edges of the container as shown at 52—52. Covers 49—49 may consists of an homogeneous annular plug of a semi-soft rubber or may consist of a laminated plug of hard rubber, Bakelite, fibre, or the like, lined with a gasket of semi-soft insulating material so as to form an hermetically tight seal between the cover, the container and the protruding portion of core 44.

Terminals 53—53 are secured to the ends of the core 44. A wide metal clamp or lug 55 is soldered, welded, or bolted in direct contact over a relatively large area of container 47. In practice this clamp 55 serves both as the mounting member for the device and as a circuit connection, usually to ground. The use of a wide mounting lug such as 55 is effective in minimizing terminal coupling impedance.

The artificial transmission lines of my invention may be connected in multiple either as individual units or as a multi-section unit. A dual section unit based on the construction shown in Figure 10 and particularly suitable for high frequency applications is illustrated in Figure 11. The arrangement shown in Figure 11 comprises adjacently positioned metal foils 61 and 62, each convolutely wound with a foil 60 with the interposition of insulating dielectric spacers 63 and 64 about an electrically-conducting core 65. Foil 60 extends from both ends of the composite section whereas foils 61 and 62 are spacedly insulated from each other and contained within the section. Foil 60 is electrically connected to the core 65 by means of low resistance solder shunts 66—67 which embed the ends of the foil and adjacently positioned portions of the core. It is also convenient and desirable to connect foil 60 to the core 65 by means of its inner turn which is not insulated therefrom by a dielectric spacer. Foils 61—62 are each electrically connected to separate terminals 68—69, said connection being effected by integral band portions 70—71 respectively of the terminals which band portions encircle the exposed turn of the respective foils and are soldered thereto. The dual section unit is enclosed within an open-ended insulating casing 72 of laminated paper or the like, which in turn is sealed by covers 73—74 secured within the ends of the casing. A tight seal between the terminals 68—69 and the container 72 is provided by means of threaded nuts 75—76 respectively, which further serve to securely anchor the terminals in position. It is also possible to employ metal casings for the dual unit section and insulate at least one of the terminal nuts 68—69 therefrom.

In one typical circuit application the device of Figure 11 is placed in circuit by means of terminals 77—77 affixed to the core 65 whereby one of the terminals 77 forms with each of the terminals 68—69 the input connections of the artificial transmission line and the other of the terminals 77 forms with each of the terminals 68—69 the output connections of the transmission line. In practice each of these terminals 68—69 is grounded and for high frequency applications such grounds are preferably made individually directly to separate points of the electrical system embodying the device. According to another application one terminal 77 and terminal 68 may serve as the input connections of the transmission line and terminal 69 and the other terminal 77 may form the output connections of the transmission line.

Figure 12 represents a simplified side view of a transmission line of this invention without the metal casing, since metal casings may be replaced by resin coatings or other nonmetallic casings in my devices. In this drawing the terminal arrangement is that achieved by employing the construction shown in connection with Figure 4. 80 represents the wound unit with dielectric insulating material on the outer surface and the extremities of wide foil 21 extending from the sides thereof. Terminal lead wires 81—82 are soldered to the extended edges of foil 21 by means of solder 84—83 respectively to form a low resistance shunt connection throughout the extended edge section of the wide foil 21. Terminals 26—27 at each side extremity of the narrow foil 20 extend from the side of the wound unit (insulated from foil 21) and are directly terminated to a ground or chassis section. For mounting and terminating convenience terminals 26—27 may be of fairly heavy stock and have holes drilled therein.

Figure 13 illustrates a simple electrical circuit employing the artificial transmission line of the invention to good advantage. 90 represents a transformer which converts the voltage of alternating electric currents from a primary power supply to voltages suitable for use in feeding to a rectifier tube 91. The rectified output of tube 91 is a pulsating direct current which is passed through a filter section comprising the artificial transmission line 92 and with a filter choke 93 in series with another transmission line 94 to a positive bus B+. Between this bus and the B— or ground return of the transmission line and rectifier output, a substantially ripple-free direct current can be taken. Artificial transmission lines such as those shown in Figure 10 are useful in this connection, although dual sections such as those shown in Figure 11 may also be employed. An artificial transmission line employed in this manner to replace the conventional filter condenser will bypass out high frequencies which are undesirable in a direct current power supply and which would otherwise find their way to the B+ bus.

In Figure 14 a schematic electrical diagram of the transmission lines of this embodiment is shown. 110 and 111 represent parallel conductors between which is distributed capacitance 114, and along conductor 110 are disposed distributed inductance 112 and distributed resistance 113. Delta L represents one small portion of the parallel conductor section. Conductor 110 is provided with a single terminal 115, while conductor 111 is provided with a terminal 116 along the length of the conductor. This terminal in turn is connected to a conductor 119, the ends of which 117—118 serve as electrical connecting elements. It will be apparent that this schematic illustration is identical with that previously described with the exception of the terminating arrangement for one of the electrode foils.

Figure 15 shows a laid-out arrangement of the electrode foils and dielectric spacers of the transmission line illustrated in Figure 14 before winding. 120 is a narrow electrode foil and 121 is the wide electrode foil, one edge 125 of which extends beyond the edges of dielectric spacers 122—123. Terminal 124 is connected at one point, preferably the outer extremity, on narrow electrode foil 120.

Figure 16 shows a simplified cross-sectional view of the wound artificial transmission line illustrated in Figures 14 and 15. Narrow electrode 120 and wide electrode foil 121 is convolutely wound with and separated by dielectric spacers 122—123. One edge 125 of wide electrode foil 121 extends beyond the dielectric spacers 122—123 along substantially the entire winding and is interconnected by means of a low resistance shunt 126 to a central conductor 127 which passes through the axis of the winding and which if so desired may serve as the core upon which the line is wound. Terminal element 124 is connected to the outer extremity of narrow electrode foil 120 and extends from the opposite side of the winding from foil 121. While for convenience sake it is generally preferable to dispose terminal 124 at the outer extremity of narrow foil 120, it may be located at other points in the winding. Further, if so desired, a number of terminals may be attached to the narrow foil which effectively produces a series of artificial transmission lines in parallel. The plurality of terminals so employed may be used as individual circuits connections or may be interconnected as an aggregate terminal.

The arrangement described above possesses a common coupling impedance, when employed as a filter network, which is especially low and almost as low as that characteristic of the previously described artificial transmission lines.

It, likewise, possesses the distributed constants of the other embodiments and an even greater simplicity of structure. It may be encased in a metal container or may be provided with a molded resin insulating casing or may be used without a casing with substantially equivalent electrical properties. Thermosetting resins as well as thermoplastic resins may be used as molding materials for the manufacture of the insulating casings about the said unit. In some instances, it is possible to employ simply a cardboard casing, preferably treated with wax or a resin to improve the physical properties thereof. According to another embodiment, the unit is impregnated with a monomeric resinous material which is subsequently polymerized in situ to a solid mass, resulting in a durable, permanently protected transmission line.

With reference to the physical structure of my lines, I prefer to use electrode foils of aluminum, lead, tin, and related metals or their alloys which are higher in resistivity than copper, although copper may be employed with slightly inferior results. The dielectric material separating and insulating the electrode foils may be a resin film type, paper, regenerated cellulose, etc., and if so desired may be impregnated with a mineral oil, a synthetic resin, vegetable oil, hydrocarbon waxes and the like. I have achieved optimum results using calendered kraft paper impregnated with mineral oil as dielectric spacing material in conjunction with thin aluminum foil of thickness of approximately .00025". In order that the transmission lines may be employed in circuits carrying a heavy load of direct current the cores employed may be relatively heavy conductors such as 1/8" or 1/4" tin-plated copper rods, even though the electrode foils themselves are very thin. If so desired, the core may be produced of a high permeability material such as carbonyl iron which will increase the inductance effects in the narrow electrode foils and therefore effect different properties in the finished product. This high permeability core may be adjustable if so desired.

While I have not specified that other types of electrode foils and spacing materials may be employed, I contemplate that a so-called electrolytic type transmission line may be produced by use of a heavier aluminum electrode foil upon which may be formed thin aluminum oxide films. In this case the dielectric spacer is replaced by a porous material saturated with a high-conducting electrolyte such as ammonium borate dissolved in ethylene glycol. The capacity between the electrode foils per unit length will be increased with this construction.

The use of cylindrical or other shaped metal container for the transmission lines of the invention is by no means critical since the uncased wound units themselves with the terminal arrangement shown in Figures 2, 3, and 4 are outstanding in their characteristics and usefulness. The metal casings add to the durability, simplicity of mounting and in some cases simplicity of electrical connection into the circuit.

As many widely different embodiments of this invention may be made without departing from the spirit and scope hereof, it is to be understood that the invention is not limited to the specific embodiments hereof except as defined in the appended claims.

What I claim is:

1. An artificial transmission line comprising two layers of electrically-conducting materials separated by layers of dielectric material and convolutely wound, one of said layers of electrically-conducting materials being connected on both sides throughout substantially its entire length to terminals and the other of said layers of electrically-conducting materials being connected to a terminal structure symmetrically with respect to the width of the layer.

2. An artificial transmission line comprising two electrode foils separated by layers of dielectric material and convolutely wound upon a high permeability core, one of said electrode foils being connected on both sides throughout substantially its entire length to terminals and the other of said electrode foils being connected to a terminal only at a median point, with respect to the width of said foil.

3. An artificial transmission line comprising two electrode foils separated by layers of dielectric material and convolutely wound upon an electrically-conducting core, one of said electrode foils being connected on both sides throughout substantially its entire length to said core and the other of said foils being connected to a terminal only at a median point, with respect to the width of said foil.

4. An artificial transmission line comprising a wide electrode foil and a narrow electrode foil separated by layers of dielectric material of intermediate width and convolutely wound, the wide electrode foil being connected on both sides throughout substantially its entire length to terminals and the narrow electrode foil being connected to a terminal structure at the outer extremity of said foil symmetrically with respect to the width thereof.

5. An artificial transmission line comprising a wide electrode foil and a narrow electrode foil separated by layers of dielectric material of intermediate width and convolutely wound, the wide electrode foil being connected on both sides throughout substantially its entire length to terminals and the narrow electrode foil being connected to a terminal only at the center of the outer extremity of said foil.

6. An artificial transmission line comprising a wide electrode foil and a narrow electrode foil separated by layers of dielectric material of intermediate width and convolutely wound, the wide electrode foil being connected on both sides throughout substantially its entire length to terminals and the narrow electrode foil being connected to a terminal over substantially the entire width of its outer extremity.

7. An artificial transmission line comprising a wide electrode foil and a narrow electrode foil separated by layers of dielectric material of intermediate width, the longitudinal center line of each of said foils registering with each other and the resulting assembly being convolutely wound, the projecting edges of the wide foil being imbedded in low resistance electrically-conducting material which is connected to terminals for the system and the narrow foil being connected to a terminal of the system only at a median point, with respect to the foil width, of the outer extremity of said foil.

8. An electrical circuit useful as a transmission line and in bypassing undesired high frequencies comprising the artificial transmission line of claim 5 wherein the terminal at one side of the wide foil and the terminal at the outer extremity of narrow foil are connected as input terminals and the terminal at the opposite side of the wide foil and the terminal at the aforesaid outer extremity of the narrow foil are connected as output terminals.

9. The artificial transmission line of claim 7 wherein the terminal to the narrow foil is connected directly to a metal cylinder enclosing the convolutely wound unit.

10. A multiple artificial transmission line comprising a wide layer of electrically conducting material and two parallel positioned narrow layers of electrically conducting material separated by layers of dielectric material of width less than said wide layer and greater than said narrow layers, said conducting materials and dielectric material being convolutely wound, the wide layer of electrically conducting material being connected on both sides throughout its entire length to terminals and the narrow layers of electrically conducting material being connected at their respective outer extremities to terminal structures, each symmetrically with respect to the width of the layer.

11. An artificial transmission line as claimed in claim 1, wherein the leads from the terminal structure of the other of said layers extend out of the winding symmetrically with respect to the width of said layer.

12. An artificial transmission line as claimed in claim 5, wherein the lead from the terminal on the narrow electrode foil extends out of the winding in a plane at right angles to the axis thereof.

13. An artificial transmission line comprising a wide electrode foil and a narrow electrode foil separated by layers of dielectric material and convolutely wound, a tubular casing of conductive metal enclosing said wound foils, the wide electrode foil being connected to both sides throughout substantially its entire length to two terminals which lead out of opposite ends of the tubular casing and the narrow electrode foil being connected over substantially the entire width of its outer extremity to the casing from which a third lead is taken at substantially right angles to the axis of the winding.

NELSON E. BEVERLY.

REFERENCES CITED

The following references are of record in the file of this patent:

UNITED STATES PATENTS

| Number | Name | Date |
|---|---|---|
| 2,027,067 | Schubert | Jan. 7, 1936 |
| 2,111,710 | Van Loon | Mar. 22, 1938 |
| 2,259,234 | Voigt | Oct. 14, 1941 |
| 2,270,953 | Manz | Jan. 27, 1942 |
| 2,355,788 | Dunleavey et al. | Aug. 15, 1944 |

FOREIGN PATENTS

| Number | Country | Date |
|---|---|---|
| 519,506 | Great Britain | Mar. 28, 1940 |

Certificate of Correction

Patent No. 2,526,321　　　　　　　　　　　　　　　　　October 17, 1950

NELSON E. BEVERLY

It is hereby certified that error appears in the printed specification of the above numbered patent requiring correction as follows:

Column 6, line 11, for "$Z_1/4$" read $Z_1/2$; column 12, line 9, for the words "connected to" read *connected on*;

and that the said Letters Patent should be read as corrected above, so that the same may conform to the record of the case in the Patent Office.

Signed and sealed this 6th day of February, A. D. 1951.

[SEAL]

THOMAS F. MURPHY,
*Assistant Commissioner of Patents.*